United States Patent [19]

Centafanti

[11] Patent Number: 5,039,927
[45] Date of Patent: Aug. 13, 1991

[54] STORAGE BATTERY AND HEATER COMBINATION

[76] Inventor: Rocco Centafanti, 925 Shorecrest Dr., Deltona, Fla. 32725

[21] Appl. No.: 597,388

[22] Filed: Oct. 15, 1990

Related U.S. Application Data

[63] Continuation-in-part of Ser. No. 294,739, Jan. 9, 1989, abandoned.

[51] Int. Cl.⁵ .......................................... H02M 10/46
[52] U.S. Cl. ........................................ 320/2; 429/62; 429/120
[58] Field of Search ............... 429/62, 120; 219/202, 219/209; 307/66; 320/2, 15; 432/225; 123/142.5; 136/207

[56] References Cited

U.S. PATENT DOCUMENTS

| | | | |
|---|---|---|---|
| 1,266,780 | 5/1918 | Edison | 429/62 |
| 1,444,561 | 2/1923 | Schraeder | 219/209 X |
| 2,418,792 | 4/1947 | Riggs | 429/62 |
| 2,516,048 | 7/1950 | Endress | 429/62 |
| 2,626,971 | 1/1953 | Mansoff | 219/209 X |
| 2,700,064 | 1/1955 | Akerman | 429/62 |
| 2,761,006 | 8/1956 | Kramer | 429/120 |
| 3,110,633 | 11/1963 | Bachmann | 429/62 X |
| 3,440,109 | 4/1969 | Plattner | 429/62 |
| 3,649,366 | 3/1972 | Jordan et al. | 429/120 |
| 3,708,346 | 1/1973 | Nash | 429/62 |
| 4,095,938 | 1/1978 | Mikella | 432/225 |
| 4,572,878 | 2/1986 | Daugherty | 429/62 |
| 4,667,140 | 5/1987 | Sweetman | 307/66 |
| 4,926,106 | 5/1990 | Tanis | 320/2 X |

FOREIGN PATENT DOCUMENTS 2161317  1/1986  United Kingdom ................ 429/120

Primary Examiner—Steven L. Stephan
Assistant Examiner—Kristine Peckman

[57] ABSTRACT

The conventional storage battery of a motor vehicle is housed in a thermally insulated chamber along with a secondary storage battery provided with a circuit including a heater and a thermostatically controlled switch set to bring the heater into service whenever the temperature in the chamber drops to a predetermined low. Both batteries are connected in parallel to the alternator of the vehicle.

8 Claims, 1 Drawing Sheet

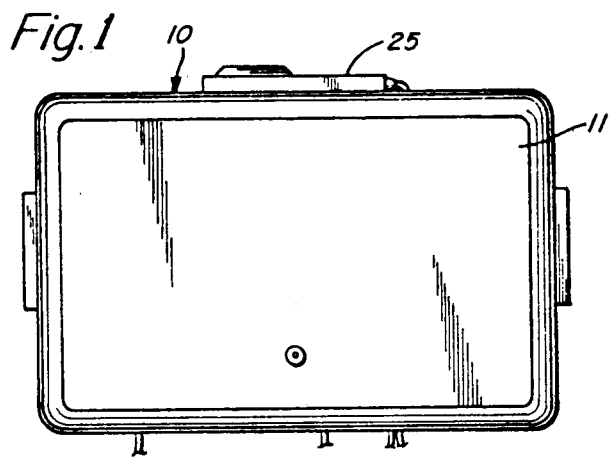
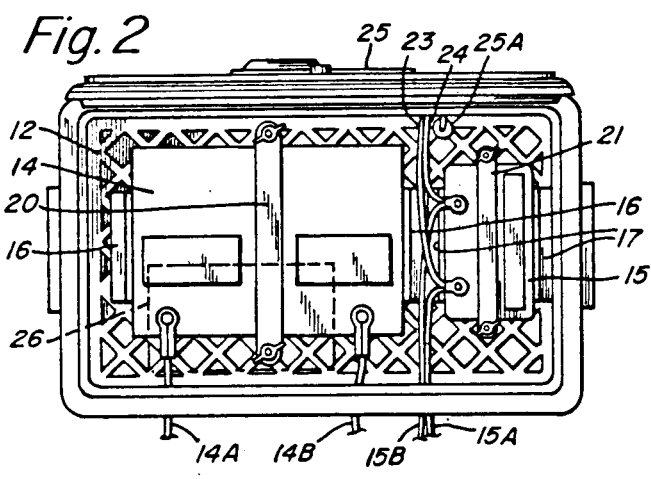
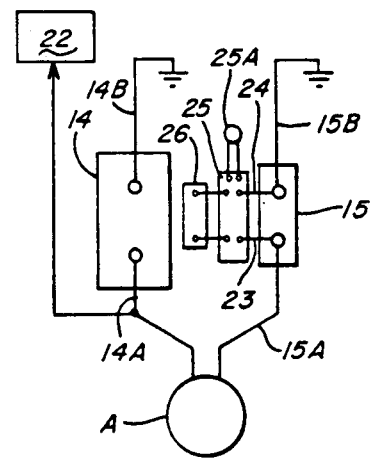
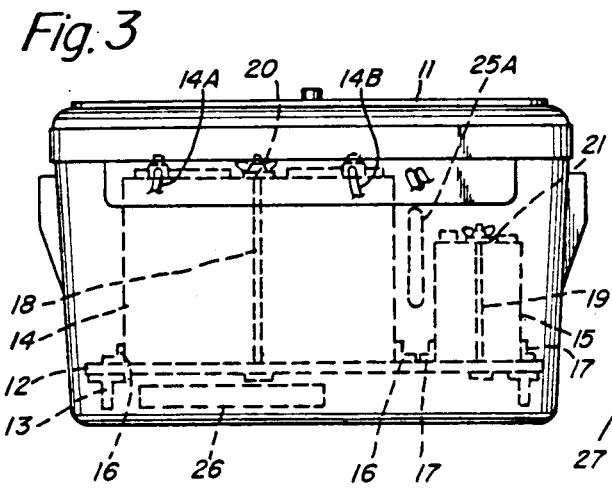
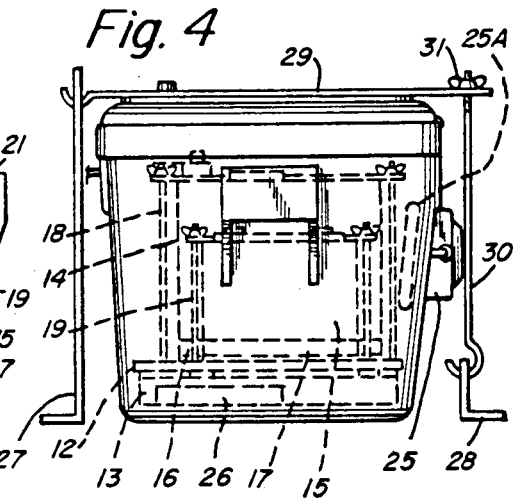

STORAGE BATTERY AND HEATER COMBINATION

This application is a continuation-in-part of Ser. No. 294,739 filed Jan. 9, 1989, and now abandoned.

BACKGROUND OF THE INVENTION

It has long been known that low temperatures adversely affect the efficiency of storage batteries as a consequence of which they can and often do become incapable of starting the engines of motor vehicles in cold weather.

Battery failures from this cause can be avoided by heating it when temperatures fall below a predetermined level. Various proposals have been made to provide thermostatically controlled heating means for heating batteries within an insulated chamber or compartment. One such proposal was to use the battery to energize the means by which it was to be heated. Another proposal was to employ catalytic heaters within the chamber with the heaters provided with their own fuel supply. Storage batteries have also been heated within an insulated chamber by means of thermostatically controlled heater circuits connectable to outside circuits. It was an earlier practise to place a household electric lamp, connected to the household circuit under the hood to facilitate engine starting.

THE PRESENT INVENTION

The general objective of the present invention is to provide a storage battery and heater combination which does not require use of the storage battery of the vehicle, outside circuitry or fuel consuming heaters.

In accordance with the invention, this objective is attained by employing a secondary storage battery, typically smaller in size than the primary battery by which the vehicle circuitry is energized. Both batteries are within an insulated chamber and both are connected to the generator means, usually an alternator. The secondary battery is provided with the thermostatically controlled heater circuit. While the secondary battery discharges at the command of the thermostat of its heater circuit to ensure that the primary battery is at a temperature at which its starting efficiency is maintained, the secondary battery is recharged whenever the engine is running.

BRIEF DESCRIPTION OF THE DRAWINGS

The accompanying drawings illustrate a preferred embodiment of the invention and FIG. 1 is a top plan view of the insulated chamber in which the primary and secondary storage batteries are housed;

FIG. 2 is a plan view of the chamber with the cover removed;

FIG. 3 is a side view of the chamber;

FIG. 4 is an end view thereof; and

FIG. 5 is a schematic view of the circuitry of the secondary battery.

THE PREFERRED EMBODIMENT OF THE INVENTION

The embodiment of the invention illustrated by the drawings utilizes an insulated chamber 10 having a removable cover 11, see FIG. 1. As shown in FIGS. 2-4, within the chamber 10, there is a reticulated floor 12, having legs 13 spacing it above the bottom of chamber 10.

The primary battery 14 and the secondary battery 15 are seated on the floor 12 and are held against movement relative to the ends of the chamber 10 by transverse flanges, the flanges 16 in the case of the battery 14 and the flanges 17 in the case of the battery 15. The floor 12 is also provided with posts 18 on opposite sides of the battery 14 and posts 19 on opposite sides of the battery 15. In the disclosed embodiment, both batteries are of the conventional, first quality, 12 volt type. By way of examples, the battery 14 is one for use in an automobile while the battery 15 is for use where a motorcycle is provided with a starting motor. The posts 18 and the posts 19 are detachably interconnected by hold down straps 20 and 21, respectively.

The primary battery 14 has cables 14A and 14B while the battery 15 has corresponding cables 15A and 15B. The cables 14A and 15A are connected to the generating means of the motor vehicle, the alternator generally indicated at A, in FIG. 5, by which the charging of the batteries 14 and 15 is conventionally effected. The cables 14B and 15B are grounded. As the vehicle circuitry is conventional, it is generally indicated at 22 and includes a starting circuit.

The secondary battery 15 has leads 23 and 24 connected through an adjustable thermostatically controlled switch unit 25 to a resistance heater 26 shown as positioned under the floor 12, see FIGS. 3 and 4, and operable to place the heater 26 in or out of service within the set temperature limits. The unit 25 is preferably mounted on the outside of the chamber 10 with its temperature probe 25A inside and adjacent the battery 14.

From the foregoing, the operation of the battery and heater combination will be apparent. A drop in the temperature within the chamber 10 below that for which the thermostat of the unit 25 is set results in the heater 26 being energized in response to the unit 25 until the set upper temperature limit within the chamber 10 is restored. While the secondary battery 15 is thus intermittently in service during the interval the vehicle is parked, it is recharged by the alternator A once the engine is running.

It is customary to provide hold down means for the batteries of vehicles. One type of such means is illustrated by FIG. 4. Holders 27 and 28, when mounted in a vehicle adjacent its engine, receive the container 10 between them. One end of a cross strap 29 is detachably caught by the upper end of the holder 27. The other end of the cross strap 29 has a bore through which extends the threaded upper end of a hook 30, caught by the holder 28. A nut 31 threaded on the end of the hook 30 extending through the strap 29 holds the strap securely against the cover 11 to prevent movement of the container 10.

It will be understood that space limitations typically dictate that the battery 15 be smaller than the battery 14. It will also be appreciated that the wattage of the heater 26 is as low as is practicable. The insulating qualities of the chamber 10, the particular battery 15 to which it is connected and the lowest anticipated temperature range in the area in which the vehicle is to be used are factors determining heat requirements. It is desirable that the wattage of the heater 26 be relatively low, less than 100 watts by way of example but not of limitation.

I claim:

1. A storage battery and heater combination for use with a vehicle having an engine provided with an alternator, said combination including an insulated chamber which is normally closed but which has a removeable cover, a primary storage battery and a secondary storage battery, both batteries within the chamber and each including a cable connectable to the alternator and a ground cable, at least a starter circuit connected to the primary battery and a circuit connected to the secondary battery and including a thermostatically controlled switch responsive to the temperatures within the chamber and a heater, said heater within the chamber.

2. The storage battery and heater combination of claim 1 in which the chamber includes a reticulated floor spaced above the bottom of the chamber and the heater is located under the floor.

3. The storage battery and heater combination of claim 2 in which the heater is below the primary storage battery.

4. The storage battery and heater combination of claim 1 in which the thermostatically controlled switch is adjustable and is mounted on the outside of the chamber and includes a probe extending into the chamber.

5. A motor vehicle having an engine provided with an alternator, an insulated chamber which is normally closed but which has a removable cover, a primary storage battery and a secondary storage battery, both batteries within the chamber and each including a cable connected to the alternator and a ground cable, at least a starter circuit connected to the primary storage battery and a circuit connected to the secondary storage battery and including a thermostatically controlled switch responsive to the temperatures within the chamber and a heater, said heater within the chamber.

6. The motor vehicle of claim 5 in which the chamber includes a reticulated floor spaced above the bottom of the chamber and the heater is located under the floor.

7. The motor vehicle of claim 6 in which the heater is below the primary storage battery.

8. The motor vehicle of claim 5 in which the thermostatically controlled switch is adjustable and is mounted on the outside of the chamber and includes a probe extending into the chamber.

* * * * *